P. GALLAGHER.
ANIMAL TRAP.
APPLICATION FILED JUNE 26, 1919.
1,369,020.
Patented Feb. 22, 1921.
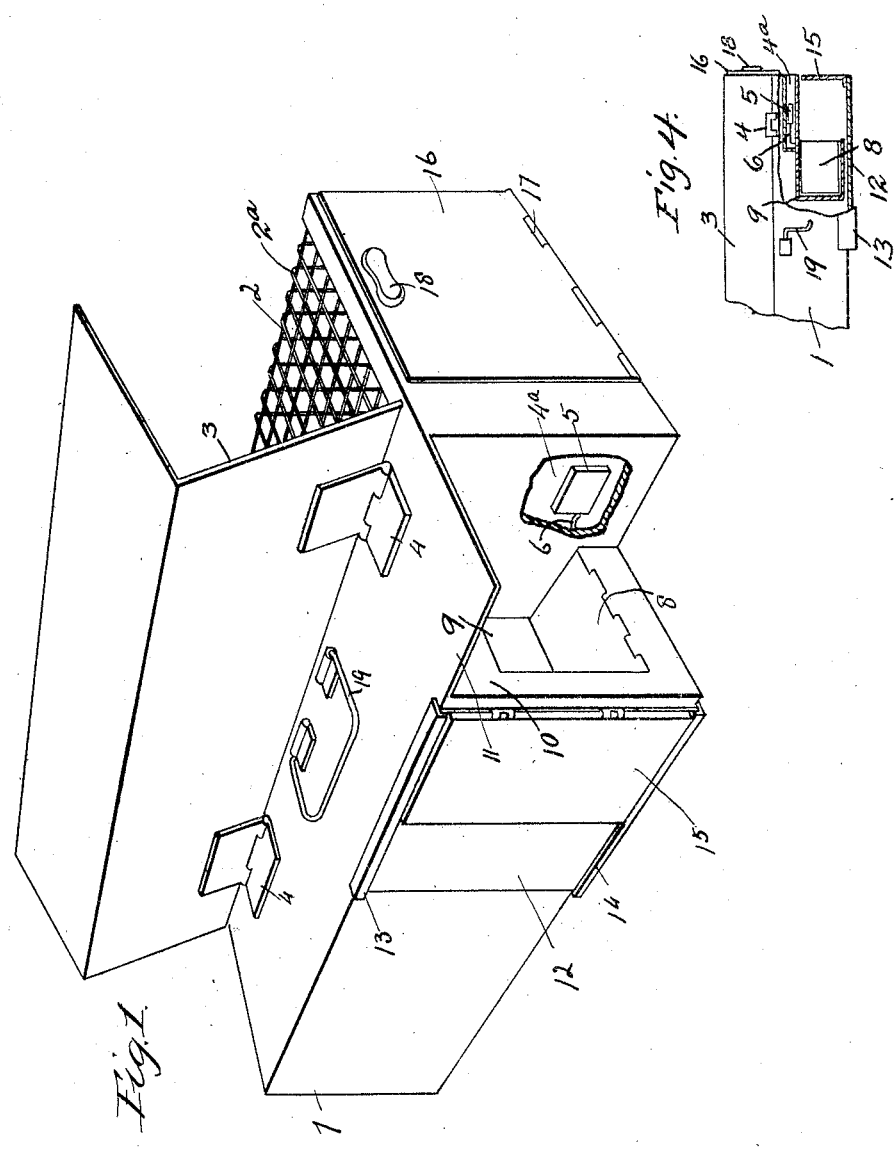
Inventor
Peter Gallagher
By W. W. Williamson
Atty.

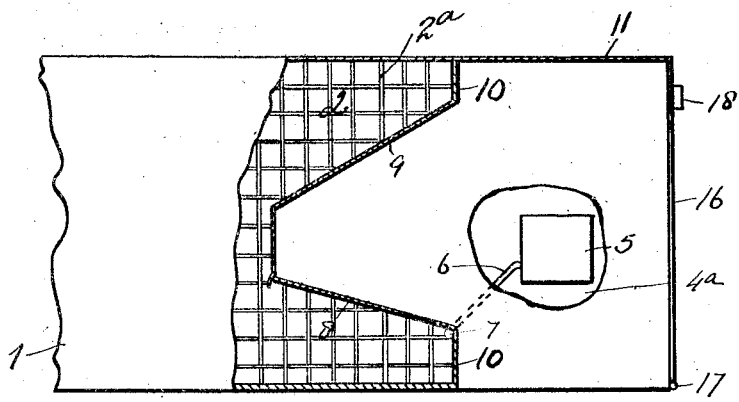
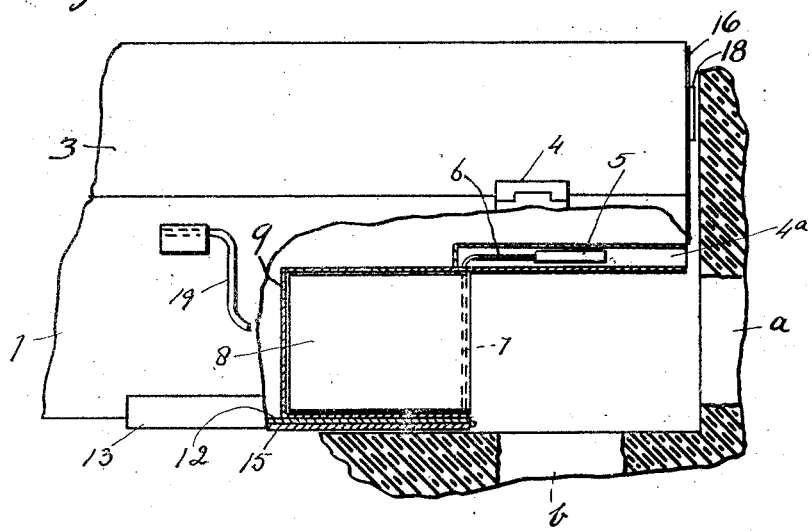

UNITED STATES PATENT OFFICE.

PETER GALLAGHER, OF PHILADELPHIA, PENNSYLVANIA.

ANIMAL-TRAP.

1,369,020. Specification of Letters Patent. Patented Feb. 22, 1921.

Application filed June 26, 1919. Serial No. 306,958.

*To all whom it may concern:*

Be it known that I, PETER GALLAGHER, a citizen of the United States, residing at Philadelphia, in the county of Philadelphia and State of Pennsylvania, have invented new and useful Improvements in Animal-Traps, of which the following is a specification.

My invention relates to new and useful improvements in animal traps, and has for its object to provide a device of this description, which in effect will continue the hole or passage way, through which the rat or other animal is accustomed to travel, and thus make sure the catching thereof.

A further object of my invention is to so construct the trap that, when one or more rats have been caught, their cries of distress will act as a decoy for bringing other rats into the trap, so that the process of catching will continue until the trap is full.

A still further object of my invention is to provide means for accommodating the trap to rat holes in various positions.

With these ends in view, the invention consists in the details of construction and combination of elements hereinafter set forth, and then specifically designated by the claims.

In order that those skilled in the art to which this invention appertains may understand how to make and use the same, I will describe its construction in detail, referring by numerals to the accompanying drawing, forming a part of this application in which:—

Figure 1 is a perspective of the trap made in accordance with my improvement, showing the slide and its hinged guard in a position which accommodates the trap to a hole in the corner of the wall, a portion of one of the partitions being broken away, so as to show the counterbalancing weight for operating the trap door.

Fig. 2 is a side elevation of a part of the trap, a portion thereof being broken away to show the internal construction, and Fig. 3 is a plan view of Fig. 2, a portion of the top being broken away and certain of the walls shown in section to more clearly illustrate the internal arrangement.

Fig. 4 is a similar view, on a reduced scale showing the slide inclosing plate closed about the vestibule.

In carrying out my invention as here embodied, 1 represents the body of the trap, which is preferably rectangular in shape, having a relatively large compartment 2 therein, which occupies the greater portion of the trap, and serves as a retaining pen. One side and a portion of the top of this compartment are inclosed by a wire netting $2^a$. A lid 3 hinged at 4 is provided for closing over this wire netting in order to exclude the light from the interior of the trap. Near one corner of the trap is formed a compartment $4^a$, in which the counterbalancing weight 5 is housed, this weight being secured upon the lever 6, having a right angled member 7 which serves as a pintle for the trap door 8.

One edge of this trap door is secured to this pintle, so that as the trap door swings up and down, the weight will move correspondingly therewith.

9 represents a hood which projects from the wall 10 into the body of the trap, the bottom of which is normally closed by the trap door 8, as clearly shown in Figs. 2 and 3.

The side wall of the compartment 2 and the wall 10. together with the overhanging section 11 of the top of the trap, form a space at the corner of the trap, which serves as a vestibule for entrance from the rat hole, and which is intended to completely inclose said rat hole as will be hereinafter explained.

12 represents a slide which is fitted to run in grooves formed by the flanges 13 and 14, and this slide has hinged thereto the inclosing plate 15, and by the proper manipulation of this slide and inclosing plate a rat hole in any position may be so inclosed that the rat must pass into the vestibule when leaving the hole, as for instance should the rat hole be in the wall of a room, either in the position indicated at *a* or *b* in Fig. 3, the swinging back of the inclosing plate 15, and the sliding back of the slide 12, will permit the trap to be placed so as to inclose such a hole in either of these positions, as clearly shown in Fig. 3, but should the rat hole be in the floor, at such a distance from the walls of the room that said walls could not be used for properly inclosing the vestibule, then the slide 12 is drawn forward until its outer edge registers with the corner of the top of the trap, and the inclosing plate 15 is swung across the front end of the vestibule, thus entirely inclosing the latter without any reference to the walls; and when these members are in this position, the trap may be placed over the hole leaving the rat no egress except into the vestibule.

As light is excluded from the interior of the trap, when the rat enters the vestibule the natural tendency will be to continue his movements, and in passing upon the trap door 8, the same will be opened by his weight overbalancing the weight 5, and he will be free to pass into the pen compartment, the trap door immediately closing behind him.

When a rat or like animal has found himself to be thus entrapped, he usually begins to give distress signals by whining, which tend to attract others of this kind, and they likewise will be entrapped.

16 is a door hinged at the bottom as indicated at 17, and having a suitable latch 18 for securing it in its closed position, the object of this door being to remove the dead bodies of the rats after they have been scalded by lifting the lid 3, and either submerging the trap in hot water or running hot water through the wire screen.

Any suitable handle 19 may be pivoted to the top of the trap for convenience in handling the same.

In practice I have found that a trap of this description will exterminate rats from a building, since it will automatically catch and retain rats to the capacity of the pen compartment, without any attention.

If desired, bait of the proper odor to attract the particular animals desired to be caught may be placed in the compartment to attract the leader rat.

Of course I do not wish to be limited to the exact details of construction as herein shown, as these may be varied within the limits of the appended claims, without departing from the spirit of my invention.

Having thus fully described my invention, what I claim as new and useful is:

1. In a trap, a pen compartment certain walls of which are inclosed with wire netting, a hinged lid for closing over said netting, a door hinged to the trap for gaining access to the pen compartment, a vestibule formed by certain walls of the trap, a slide carried by one of said walls an inclosing plate hinged to said slide, the last two members being adapted to complete the inclosure of the vestibule, a trap door leading from the vestibule to the pen compartment, and a counter-balancing weight attached to said trap door for normally holding the latter closed.

2. In a trap, a pen compartment certain walls of which are inclosed with wire netting, a hinged lid for closing over said netting, a door hinged to the trap for gaining access to the pen compartment, a vestibule formed by certain walls of the trap, a slide carried by one of said walls, an inclosing plate hinged to said slide, the last two members being adapted to complete the inclosure of the vestibule, a hood projecting from the vestibule into the pen compartment, a trap door leading from the vestibule to the pen compartment, and a counter-balancing weight attached to said trap door for normally holding the latter closed.

3. A trap, certain of the walls of which form a vestibule, a slide carried by one of said walls adapted to partially inclose said vestibule and an inclosing plate hinged to said slide for further inclosing said vestibule.

In testimony whereof, I have hereunto affixed my signature.

PETER GALLAGHER.